(12) United States Patent
Cromartie

(10) Patent No.: US 10,954,076 B2
(45) Date of Patent: Mar. 23, 2021

(54) TELESCOPING POLE WITH GRABBING MEMBER

(71) Applicant: Brad Cromartie, Pawleys Island, SC (US)

(72) Inventor: Brad Cromartie, Pawleys Island, SC (US)

(*) Notice: Subject to any disclaimer, the term of this patent is extended or adjusted under 35 U.S.C. 154(b) by 0 days.

(21) Appl. No.: 16/458,536

(22) Filed: Jul. 1, 2019

(65) Prior Publication Data
US 2019/0321652 A1 Oct. 24, 2019

Related U.S. Application Data

(63) Continuation of application No. 15/943,953, filed on Apr. 3, 2018, now abandoned.

(60) Provisional application No. 62/480,701, filed on Apr. 3, 2017.

(51) Int. Cl.
*B65G 45/00* (2006.01)
*B65G 47/256* (2006.01)
*A01B 1/22* (2006.01)

(52) U.S. Cl.
CPC .............. *B65G 45/00* (2013.01); *A01B 1/227* (2013.01); *B65G 47/256* (2013.01)

(58) Field of Classification Search
CPC .......... B65G 7/00; B65G 45/00; B65G 45/10; B65G 45/14; B65G 47/24; B65G 47/256; B65G 47/34; B65G 47/766; B65G 47/82; B65G 2047/685; A01B 1/227
See application file for complete search history.

(56) References Cited

U.S. PATENT DOCUMENTS

| | | | | |
|---|---|---|---|---|
| 6,848,731 B2* | 2/2005 | Khubani | ................. | B25G 1/06 16/328 |
| 7,334,825 B1* | 2/2008 | Sammon | ................. | B25H 5/00 294/24 |
| 9,486,916 B1* | 11/2016 | Wyman | ..................... | B25G 3/36 |
| 10,479,614 B2* | 11/2019 | Evans | ..................... | B65G 13/00 |
| 2005/0251941 A1 | 11/2005 | Berhoff | | |
| 2010/0192738 A1 | 8/2010 | Fenstemaker | | |
| 2018/0281169 A1* | 10/2018 | Cromartie | ................ | B25G 1/04 |

* cited by examiner

*Primary Examiner* — Gene O Crawford
*Assistant Examiner* — Keith R Campbell
(74) *Attorney, Agent, or Firm* — Southeast IP Group LLC; Thomas L. Moses

(57) ABSTRACT

A telescoping pole is provided with a device for attaching a series of removable grabber attachments at one end. One such attachment resembles the head of a hoe, where a flat blade member is attached to a shaft, so that the flat blade member is oriented in a generally perpendicular relation to the longitudinal axis of the telescoping pole. The shaft of the hoe head includes complementary attachment devices that allows the hoe head to be attached to one end of the telescoping pole. Additionally, other attachments may be used interchangeably with the telescoping pole, including a removable hook member or a removable claw member. Further, an extension member may be added to the end of the telescoping pole to extend the range of the pole, and the hoe head attachment (and other attachments) may be attached at the end of the extension member.

7 Claims, 6 Drawing Sheets

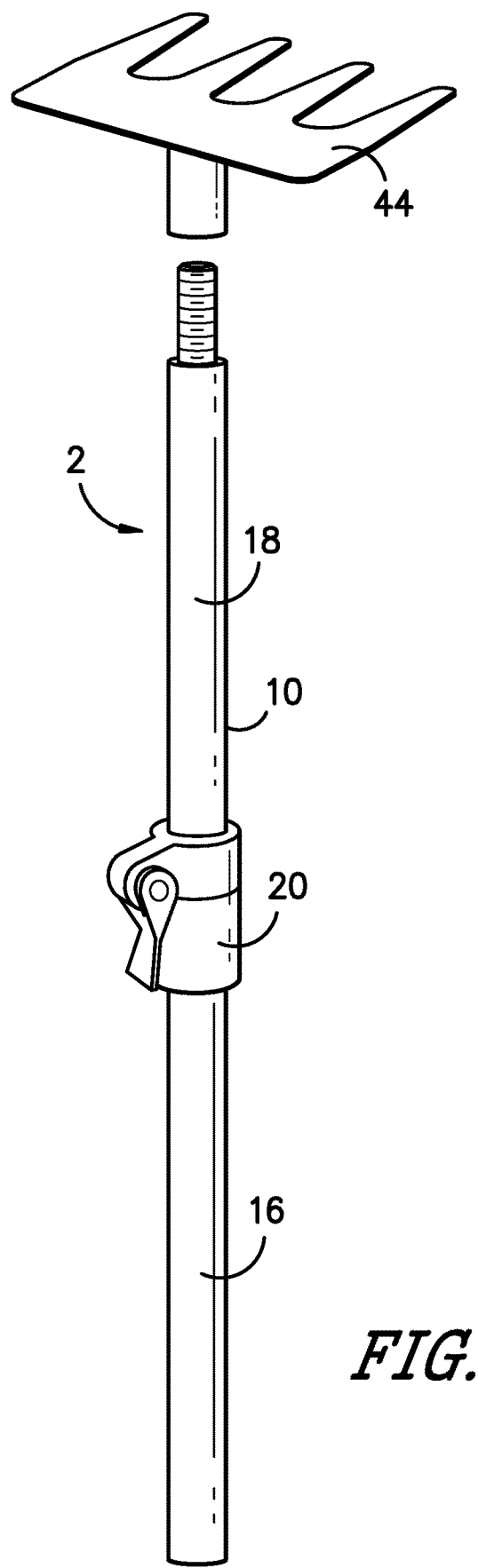
FIG. -1-

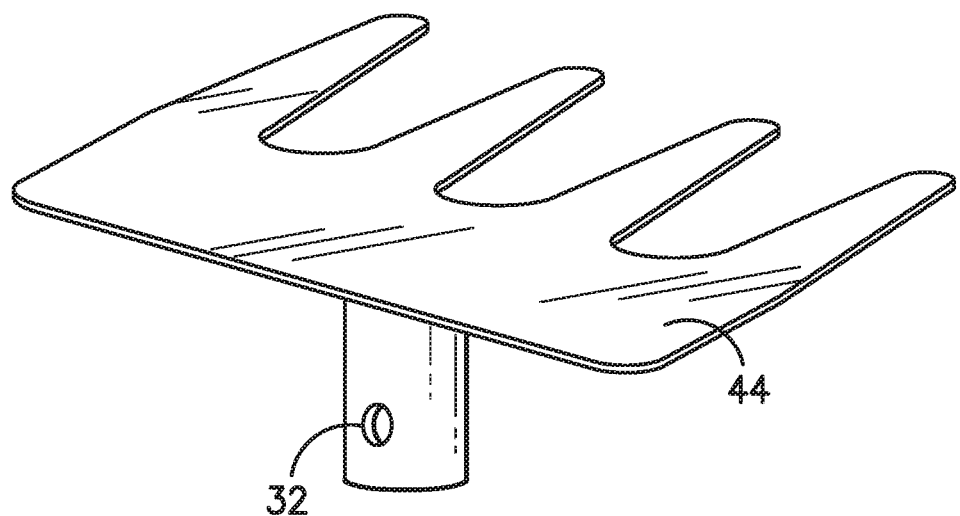
FIG. -2-
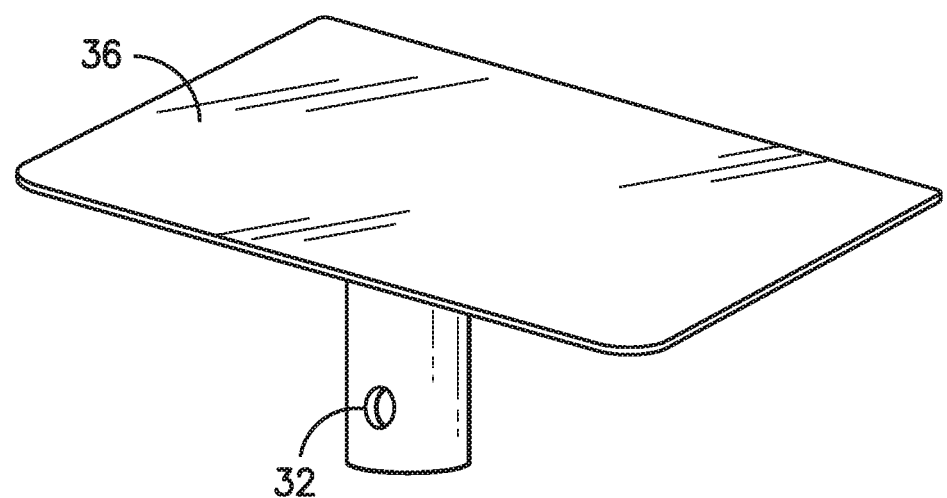
FIG. -3-

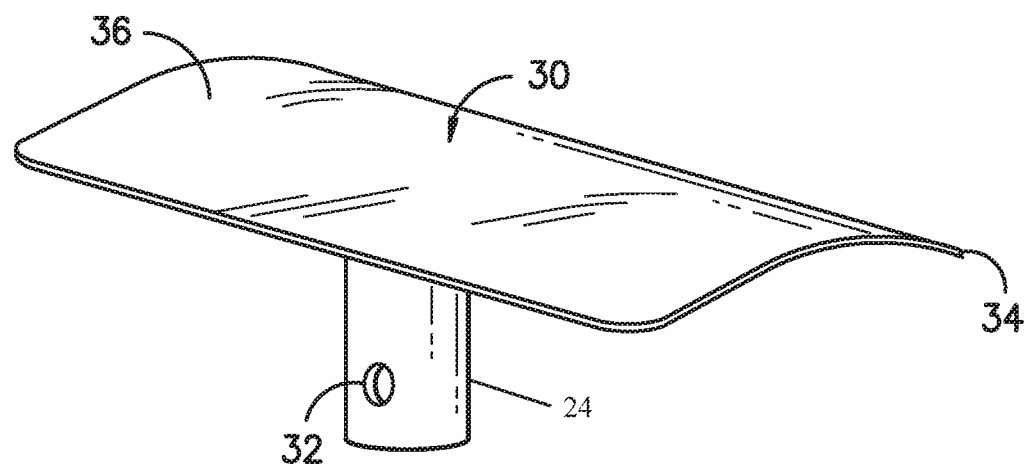
FIG. -3A-
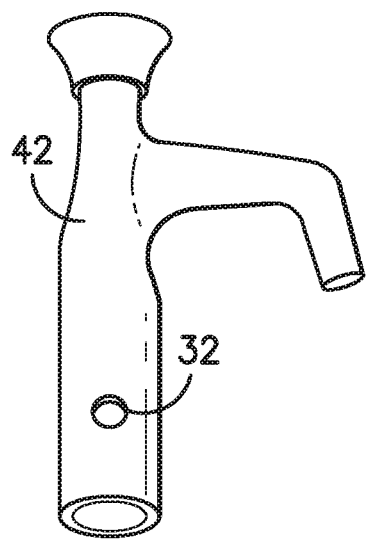
FIG. -4-

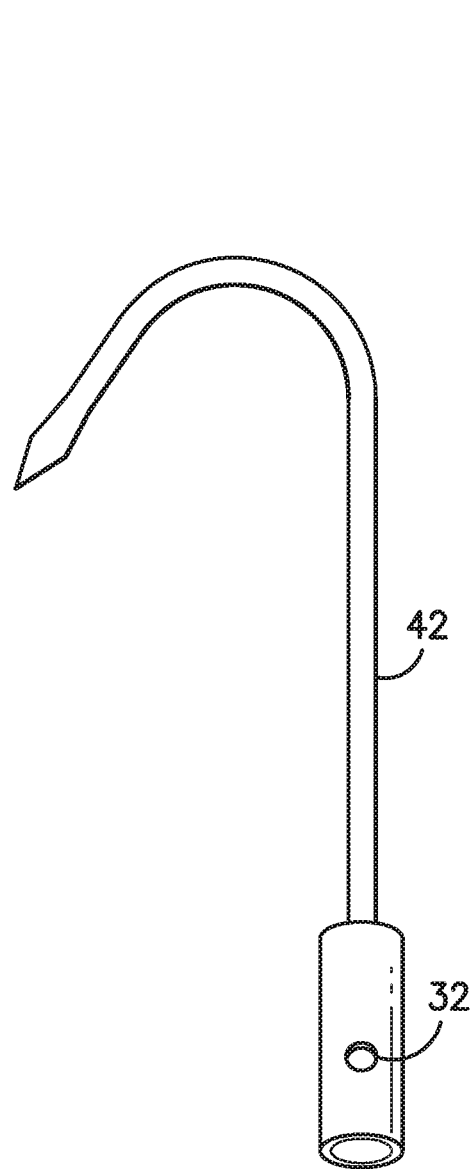
FIG. -5-
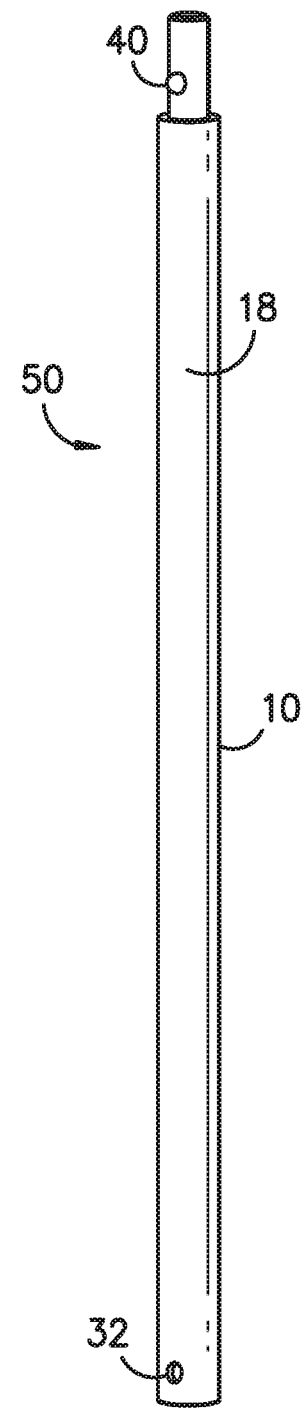
FIG. -6-

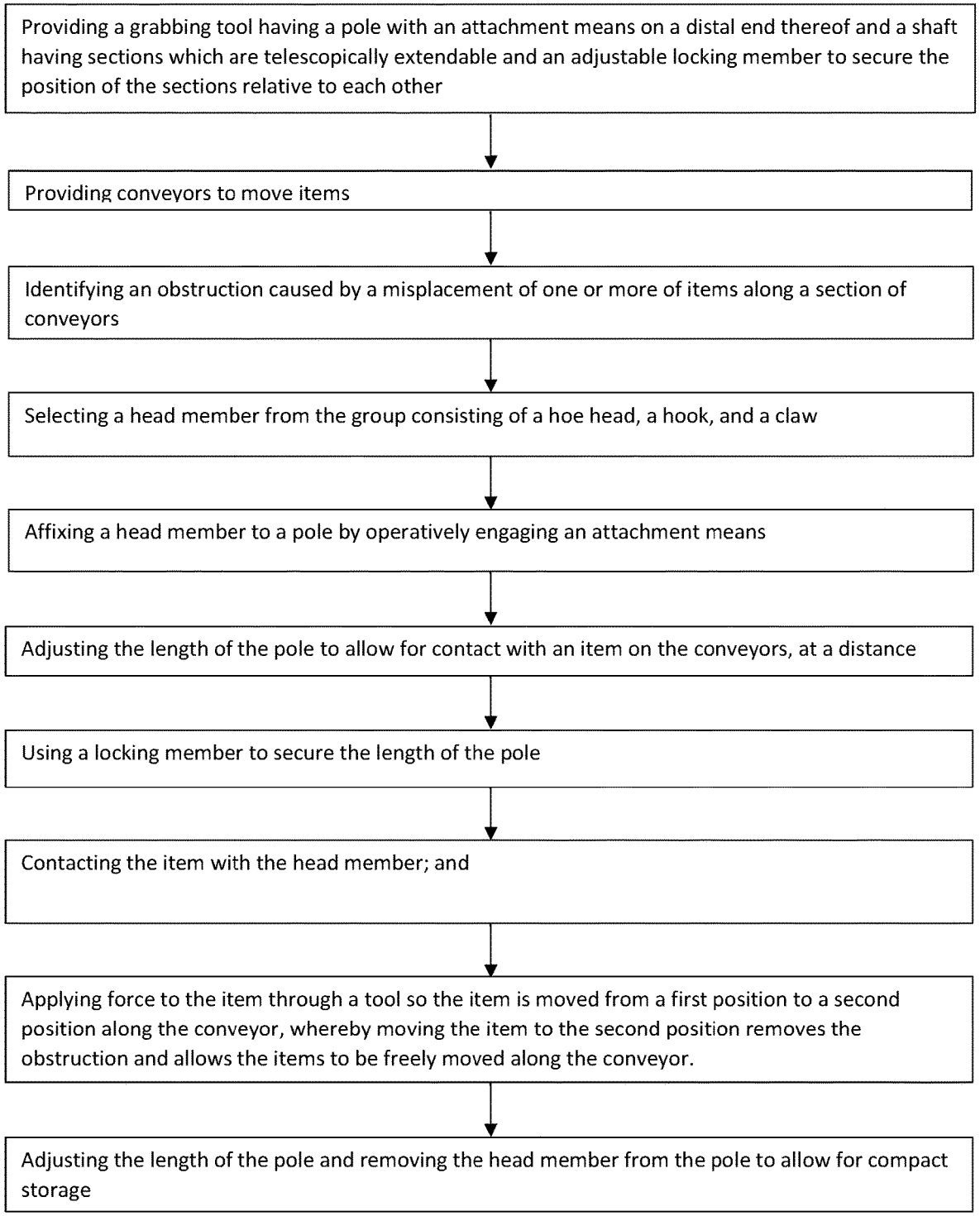
FIG. -7-

A method for clearing an obstruction along a conveyor comprising:

- Providing a grabbing tool having a pole with an attachment means on a distal end thereof and a shaft having sections which are telescopically extendable and an adjustable locking member to secure the position of the sections relative to each other
- Providing an extension member having opposed first and second distal ends and a second attachment means on the second distal end
- Providing conveyors to move items
- Identifying an obstruction caused by a misplacement of one or more of the items along a section of conveyors
- Selecting a head member from the group consisting of a hoe head, a hook, and a claw
- Affixing the first end of the extension member to the pole by operatively engaging the first attachment means
- Affixing the head member to the extension member by operatively engaging the second attachment means
- Adjusting the length of the pole to allow for contact with an item on the conveyors, at a distance
- Using the locking member to secure the length of the pole
- Contacting the item with the head member and
- Applying force to the item through the tool so the item is moved from a first position to a second position along the conveyor

FIG. -8-

TELESCOPING POLE WITH GRABBING MEMBER

CROSS REFERENCE TO RELATED APPLICATIONS

The present application is a continuation of U.S. application Ser. No. 15/943,953, entitled Telescoping Pole with Grabbing Member, filed on Apr. 3, 2018, which is a non-provisional of U.S. Provisional Application No. 62/480,701, entitled Telescoping Pole with Grabbing Member, filed on Apr. 3, 2017. All of the foregoing applications are hereby incorporated by reference in their entireties.

BACKGROUND OF THE INVENTION

There are many situations where a person may need to reach an item on a high shelf, particularly in commercial warehouses, large box stores and the like, and the item is difficult for the person to reach. Oftentimes in large box stores, such as Home Depot, Best Buy or WalMart, for example, items are stacked three or four boxes deep on large shelves that extend from the floor to near the ceiling. Even when a worker uses a stool, ladder or even a small hydraulic cherry-picking type of machine to elevate them to the upper shelves, the item may be set so far back on the shelf that the person has trouble reaching it to retrieve it. Additionally, in manufacturing or distribution centers, where assembly lines are used to transport large items, sometimes the items become jammed together, creating a logjam effect, and a worker must move the items around to keep the items flowing along the assembly line properly. In such a case, having a tool to be able to push or pull the items in a desired direction would be most helpful.

There are many types of devices currently on the market to help a person grab something that is out of reach. For example, U.S. Pat. No. 6,848,731 discloses an elongate engagement tool that has engagement elements located on a distal end of a first rod, a handle on the proximate end of second rod, a controller on the handle to control the engagement elements, and a linkage between the controller and engagement elements to control the engagement elements is disclosed. The rods are connected together by a locking hinge. A locking pin is received by the knuckles of the hinges has a plurality of axial segments. The profiles of the axial segments alternate from round disks to aster shaped disks that closely fit into the apertures formed by the knuckles. When the locking pin is moved to a first locked position where the aster shaped profiled sections are aligned with the apertures in the corresponding knuckles to the hinge is locked. Movement of the pin to a second free position where the round axial sections are aligned with the apertures in the knuckles provides for limited rotational movement.

However, this tool is only useful for grabbing smaller items that fit within the engagement elements, and is not particularly useful for moving larger boxes forward on a shelf, for instance. Thus, it would be desirable to provide a tool that allows a person to reach a large item, such as a box, and engage the box in order to pull it forward on a shelf, to facilitate retrieval.

BRIEF SUMMARY OF THE INVENTION

In a first embodiment, a telescoping pole is provided with means for attaching a series of removable attachments at one end. One such attachment (hereinafter referred to as a "hoe head") resembles the head of a hoe, where a flat blade member is attached to a shaft, so that the flat blade member is oriented in a generally perpendicular relation to the longitudinal axis of the telescoping pole. Optionally, the flat blade member may have a slight inward curvature, in order to squeeze the hoe head between boxes or items, and to help grab them from a backside. The shaft member includes complementary attachment means that allows the hoe head to be attached to one end of the telescoping pole. This arrangement allows a user to attach the hoe head to the telescoping pole, and then to use the assembly to reach behind a box on a shelf, for instance, and engage the back of the box with the flat blade member, in order to pull the box to the front of the shelf for easy retrieval by the user.

The hoe head may come in several different sizes, all of which may be used interchangeably with the telescoping pole, so that larger hoe heads may be used for larger boxes or items. Additionally, other attachments may be used, including a removable hook member or a removable claw member, depending on which attachment is most useful for a specific situation. Further, an extension member may be added to the end of the telescoping pole, wherein the extension member serves to extend the range of the pole, and the extension member includes the same attachment means as the telescoping pole, so that the hoe head attachments (and other attachments) may be attached at the end of the extension member.

BRIEF DESCRIPTION OF THE DRAWINGS

These and other features, aspects, and advantages of the present invention will become better understood with regard to the following description, appended claims, and accompanying drawings where:

FIG. 1 is a perspective, exploded view of one embodiment of a telescoping pole having a spring loaded button for receiving and securing an attachment on a first end thereof, and a detachable claw head attachment having an opening to receive the first end of the telescoping pole, along with a hole for receiving the spring loaded button for securement thereto;

FIG. 2 is a perspective view of one embodiment of a claw attachment that may be removably attached to a telescoping pole;

FIG. 3 is a perspective view of one embodiment of a hoe head attachment having a flat blade that may be removably attached to a telescoping pole;

FIG. 3A is a perspective view of another embodiment of a hoe head attachment having a curved blade that may be removably attached to a telescoping pole;

FIG. 4 is a perspective view of one embodiment of a hook member that may be removably attached to a telescoping pole; and FIG. 5 is a perspective view of another embodiment of a hook member that may be removably attached to a telescoping pole.

FIG. 6 is a perspective view of an extension member.

FIG. 7 is a flowchart illustrating the steps of the method for clearing an obstruction along a conveyor; and FIG. 8 is a flowchart illustrating the steps of an alternate method for clearing an obstruction along a conveyor by using an extension member to increase the length of the telescoping pole.

DETAILED DESCRIPTION OF THE INVENTION

The present invention includes, in a first embodiment, a telescoping pole 2 including a shaft 10 may be formed to extend or retract telescopically in measured increments (for instance by using a spring loaded pin on one telescoping portion that engages spaced holes on the other telescoping portion), or it may be infinitely adjustable (by using a twist-locking and unlocking mechanism or a locking release as shown in FIG. 1, for example). The shaft includes a first end 16, which may include a handle portion, and a second end 18 having attachment means for receiving removable attachments. Alternatively, the shaft need not be telescoping.

A removable or detachable hoe head 30 may be attached to the attachment means, as shown. The hoe head 30 includes attachment means 32, a shaft 24, and a flat blade member 36 attached to a shaft, so that the flat blade member 36 is oriented in a generally perpendicular relation to the longitudinal axis of the telescoping pole 2. Optionally, the flat blade member 36 may have a slight inward curvature (as shown in FIG. 3A), in order to squeeze the hoe head 30 between boxes or items, and to help grab them from a backside. In one embodiment, the flat blade member 36 may be coated with rubber, or some other material with a high coefficient of friction, so that the flat blade 36 has more frictional engagement with the item, thus reducing the tendency for the flat blade 36 to slide off of the target surface while pulling the item forward.

The hoe head 30 includes complementary attachment means 32, so that it may be received by the attachment means 40 on the end of the telescoping pole 2, and may be removed and replaced with other accessories. This arrangement allows a user to place the hoe head 30 on the end of the telescoping pole 2, extend the telescoping pole 2 to a desired length, and then to use the assembly to reach behind a box or an item on a shelf and pull it forward for purposes of retrieval and removal from the shelf.

The hoe head may be detachable, as shown in FIG. 3, so that it may be replaced with other accessories, such as a hook 42 (shown in FIGS. 4 and 5), a claw 44 (as shown in FIGS. 1 and 2), or an extension member 50. Additionally, hoe heads 30 of different sizes may be used interchangeably, depending upon the size of the target item that needs to be moved. The hoe head 30 and the other attachments may be removably attached using any suitable means, such as a threaded portion that screws into the shaft, a locking pin mechanism or a spring-loaded push button (as shown in FIG. 1), by way of illustration. The extension member 50 may be added to the end of the telescoping pole 2, wherein the extension member 50 serves to extend the range of the pole 2, and the extension member 50 includes the same attachment means 40, 32 as the telescoping pole, so that the hoe head attachments 30 (and other attachments) may be attached at the end of the extension member 50.

The components of the telescoping pole 2 and attachments may be made from any suitable material, including wood, plastic, metal, fiberglass, urethane or rubber substances, as well as a coating of polyurethane or similar substance may be applied to any wood components for protection against water, pests, mold and rot.

In use, a user simply chooses the attachment that best serves the purpose at hand, attaches the attachment to the end of the telescoping pole 2, and then uses the assembly to reach items that are otherwise difficult to reach. For instance, if the target item includes a handle (such as a cooler, for example), it may be useful to employ one of the hooks 42 shown in FIGS. 4 and 5 to engage the handle and pull it back toward the user. If the target item is out of range of the telescoping pole 2, then the extension member 50 may be attached to the end of the pole 2, and the appropriate attachment may be removably attached to the opposite (distal) end of the extension member 50. When not in use, the telescoping pole 2 may be retracted to its shortest position for transportation or storage.

The telescoping pole 2 and attachment accessories may also be used for purposes of pushing items in a desired direction. For instance, in manufacturing or distribution centers, where assembly lines are used to transport large items, sometimes the items become jammed together, creating a logjam effect, and a worker must move the items around to keep the items flowing along the assembly line properly. The telescoping pole 2 and attachment accessories may be used to push or pull the jammed items in a desired direction, in order to break up the jam on the assembly line.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for clearing an obstruction along a conveyor comprising:
    providing a grabbing tool having a pole with an attachment means on a distal end thereof and a shaft having sections which are telescopically extendable and an adjustable locking member to secure the position of said sections relative to each other;
    providing conveyors to move items;
    identifying an obstruction caused by a misplacement of one or more of said items along a section of said conveyors;
    selecting a head member from the group consisting of a hoe head, a hook, and a claw;
    affixing said head member to said pole by operatively engaging said attachment means;
    adjusting the length of said pole to allow for contact with an item on said conveyors, at a distance;
    using said locking member to secure the length of said pole;
    contacting said item with said head member; and
    applying force to said item through said tool so said item is moved from a first position to a second position along said conveyor,
    whereby moving said item to said second position removes said obstruction and allows said items to be freely moved along said conveyor.

2. The method for clearing an obstruction along a conveyor of claim 1, wherein said attachment means is selected from the group consisting of a threaded portion that mates with a threaded portion of said head member, a locking pin mechanism, and a spring-loaded push button mechanism.

3. The method for clearing an obstruction along a conveyor of claim 1, wherein said attachment means includes a spring loaded button that engages through a hole defined in a receiving portion of said head member.

4. The method for clearing an obstruction along a conveyor of claim 1, wherein said telescoping shaft is infinitely adjustable.

5. The method for clearing an obstruction along a conveyor of claim 1, wherein said head member includes a rubber coating on an exterior portion thereof.

6. The method for clearing an obstruction along a conveyor of claim 1, further including the step of adjusting the length of said pole and removing said head member from said pole to allow for compact storage.

7. A method for clearing an obstruction along a conveyor comprising:
- providing a grabbing tool having a pole with an attachment means on a distal end thereof and a shaft having sections which are telescopically extendable and an adjustable locking member to secure the position of said sections relative to each other;
- providing an extension member having opposed first and second distal ends and a second attachment means on said second distal end;
- providing conveyors to move items;
- identifying an obstruction caused by a misplacement of one or more of said items along a section of said conveyors;
- selecting a head member from the group consisting of a hoe head, a hook, and a claw;
- affixing said first end of said extension member to said pole by operatively engaging said first attachment means;
- affixing said head member to said extension member by operatively engaging said second attachment means;
- adjusting the length of said pole to allow for contact with an item on said conveyors, at a distance;
- using said locking member to secure the length of said pole;
- contacting said item said head member; and
- applying force to said item through said tool so said item is moved from a first position to a second position along said conveyor,
- whereby moving said item to said second position removes said obstruction and allows said items to be freely moved along said conveyor.

* * * * *